US008157458B2

(12) United States Patent
Niwamae

(10) Patent No.: US 8,157,458 B2
(45) Date of Patent: Apr. 17, 2012

(54) FOCAL-PLANE SHUTTER APPARATUS AND IMAGE-PICKUP APPARATUS

(75) Inventor: Yuuki Niwamae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 12/913,192

(22) Filed: Oct. 27, 2010

(65) Prior Publication Data
US 2011/0103787 A1 May 5, 2011

(30) Foreign Application Priority Data
Nov. 2, 2009 (JP) ................................. 2009-252485

(51) Int. Cl.
G03B 9/08 (2006.01)
(52) U.S. Cl. ........................................................ 396/443
(58) Field of Classification Search .................... 396/443
See application file for complete search history.

(56) References Cited

U.S. PATENT DOCUMENTS
6,835,007 B2 * 12/2004 Toyoda ......................... 396/443
7,344,321 B2 * 3/2008 Nakagawa .................... 396/443
2011/0103787 A1 * 5/2011 Niwamae ...................... 396/463

FOREIGN PATENT DOCUMENTS
JP 11-194394 7/1999
* cited by examiner

Primary Examiner — W. B. Perkey
(74) Attorney, Agent, or Firm — Cowan, Liebowitz & Latman, P.C.

(57) ABSTRACT

The focal-plane shutter apparatus includes a cam member and being rotated by a motor in one direction such that leading and trailing blade cams respectively make contact with leading and trailing blade driving members to drive them in a charging direction in which urging members are charged, and then to allow each of the leading and trailing blade driving members to move from a charge completion position to a blade drive standby position. Leading and trailing blade inclination portions of the cam member respectively allow each of the leading and trailing blade driving members to move from the charge completion position to the blade drive standby position. In a rotation direction of the cam member, a first angular area where the leading blade inclination portion is formed on the cam member is smaller than a second angular area where the trailing blade inclination portion is formed thereon.

5 Claims, 14 Drawing Sheets

FOCAL-PLANE SHUTTER APPARATUS AND IMAGE-PICKUP APPARATUS

BACKGROUND OF THE INVENTION

1. Field of the Invention

The present invention relates to a focal-plane shutter apparatus provided in an image-pickup apparatus such as a single-lens reflex digital camera.

2. Description of the Related Art

Focal-plane shutter apparatuses include leading blade that are driven for exposure from a state of shutting a shutter aperture (hereinafter referred to as a "shut state") to a state of opening the shutter aperture (hereinafter referred to as an "opened state") and trailing blades that are driven for the exposure from the opened state to the shut state. The leading blades and the trailing blades are respectively constituted by plural light-blocking blades. The plural light-blocking blades are connected to each other by an arm member so as to form a parallel link, and thereby the light-blocking blades are parallel moved.

The arm member is driven by a driving lever that is urged by a spring. The driving lever is provided with an armature that is attracted and held by an energized electromagnet at a position where the spring is charged (hereinafter referred to as a "charged position").

Cut-off of the energization to the electromagnet allows an urging force of the spring to rotate the driving lever, and thereby the driving lever drives the plural light-blocking blades through the arm member. When exposure thus performed by movement of the leading blades and the trailing blades, a charging mechanism including a motor returns the driving levers for the leading and trailing blades to the respective charged positions while charging the spring, and returns the leading and trailing blades to respective movement start positions.

Japanese Patent Laid-Open No. 11-194394 discloses a focal-plane shutter apparatus that includes a cam member on which two cam surfaces for leading blades and trailing blades are formed which respectively return a leading blade driving lever and a trailing blade driving lever to charged positions where springs are charged, and a charging mechanism having a motor that rotates the cam member. The charging mechanism rotates the motor in one direction to cause the cam surfaces to retract from the driving levers that have been attracted by electromagnets via an armature at the charged positions, and then cuts off energization of the electromagnets to allow rotation of the driving levers by urging forces of the springs. Further, the charging mechanism drives the driving levers by the cam surfaces to the charged positions after exposure. Each of the two cam surfaces for the leading and trailing blades is formed to have an inclination portion gradually retracting from the driving lever such that no impact is generated at an attracted part of the electromagnet and the armature due to the urging force of the spring when the cam surface retracts from the driving lever located at the charged position. Angular areas where the inclination portions for the leading and trailing blade driving levers are formed on the cam member are equal to each other.

Moreover, some single-lens reflex digital cameras provided with such a shutter apparatus include a so-called live-view display function that opens the shutter apparatus before image capturing and then displays a moving image generated from outputs from an image-pickup element on a monitor.

When the live-view display is performed, the energization to the electromagnet for the leading blades is cut off, and thereby the leading blades are moved to the opened state. On the other hand, although it is necessary to also maintain the trailing blades in the opened state, continuous energization to the electromagnet for the trailing blades increases power consumption. Therefore, the shutter apparatus disclosed in Japanese Patent Laid-Open No. 11-194394 holds the trailing blade driving lever at the charged position by the cam surface for the trailing blades formed on the cam member, thereby eliminating necessity of energizing the electromagnet for the trailing blades.

However, since the angular areas where the inclination portions for the leading and trailing blade driving levers are formed on the cam member are equal to each other and a rotation speed of the motor is slow, a time required for returning the leading blade driving lever to the charged position becomes long. Therefore, a release time lag from a release instruction to exposure becomes long in a normal image capturing.

SUMMARY OF THE INVENTION

The present invention provides a focal-plane shutter apparatus capable of reducing power consumption during the live-view display and a release time lag, and provides an image-pickup apparatus with the same.

The present invention provides as one aspect thereof a focal-plane shutter apparatus including leading blades, trailing blades, a leading blade driving member configured to receive an urging force generated by a leading blade urging member to drive the leading blades, a trailing blade driving member configured to receive an urging force generated by a trailing blade urging member to drive the trailing blades, a leading blade electromagnetic holding mechanism configured to hold the leading blade driving member by using an electromagnetic force in a state where the leading blade urging member is charged, a trailing blade electromagnetic holding mechanism configured to hold the trailing blade driving member by using an electromagnetic force in a state where the trailing blade urging member is charged, a motor, and a cam member. The cam member includes a leading blade cam and a trailing blade cam, and is configured to be rotated by the motor in one direction such that the leading and trailing blade cams respectively make contact with follower portions of the leading and trailing blade driving members to drive the leading and trailing blade driving members in a charging direction in which the leading and trailing blade urging members are charged, and then to allow each of the leading and trailing blade driving members to move from a charge completion position where the drive thereof in the charging direction is completed to a blade drive standby position. The leading blade cam includes a leading blade inclination portion and the trailing blade cam includes a trailing blade inclination portion, the leading and trailing blade inclination portions respectively allowing each of the leading and trailing blade driving members to move from the charge completion position to the blade drive standby position. Furthermore, in a rotation direction of the cam member, a first angular area where the leading blade inclination portion is formed on the cam member is smaller than a second angular area where the trailing blade inclination portion is formed thereon.

The present invention provides as another aspect thereof a focal-plane shutter apparatus including leading blades, trailing blades, a leading blade driving member configured to receive an urging force generated by a leading blade urging member to drive the leading blades, a trailing blade driving member configured to receive an urging force generated by a trailing blade urging member to drive the trailing blades, a leading blade electromagnetic holding mechanism configured to hold the leading blade driving member by using an electromagnetic force in a state where the leading blade urging member is charged, a trailing blade electromagnetic holding mechanism configured to hold the trailing blade driving member by using an electromagnetic force in a state where the trailing blade urging member is charged, a motor, and a cam member. The cam member includes a leading blade cam and a trailing blade cam, and is configured to be rotated by the motor in one direction such that the leading and trailing blade cams respectively make contact with follower portions of the leading and trailing blade driving members to drive the leading and trailing blade driving members in a charging direction in which the leading and trailing blade urging members are charged, and then to allow each of the leading and trailing blade driving members to move from a charge completion position where the drive thereof in the charging direction is completed to a blade drive standby position. A controller is configured to change a rotation speed of the motor between when the leading blade cam drives the leading blade driving member and when the trailing blade cam drives the trailing blade driving member such that, when the leading and trailing blade driving members are allowed to be moved from the charge completion position to the blade drive standby position, the electromagnetic forces in the leading and trailing blade electromagnetic holding mechanisms required respectively for holding the leading and trailing blade driving members are equal to each other.

The present invention provides as still another aspect thereof an image-pickup apparatus including the above-described focal-plane shutter apparatus and an image-pickup element whose exposure amount is controlled by the shutter apparatus.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
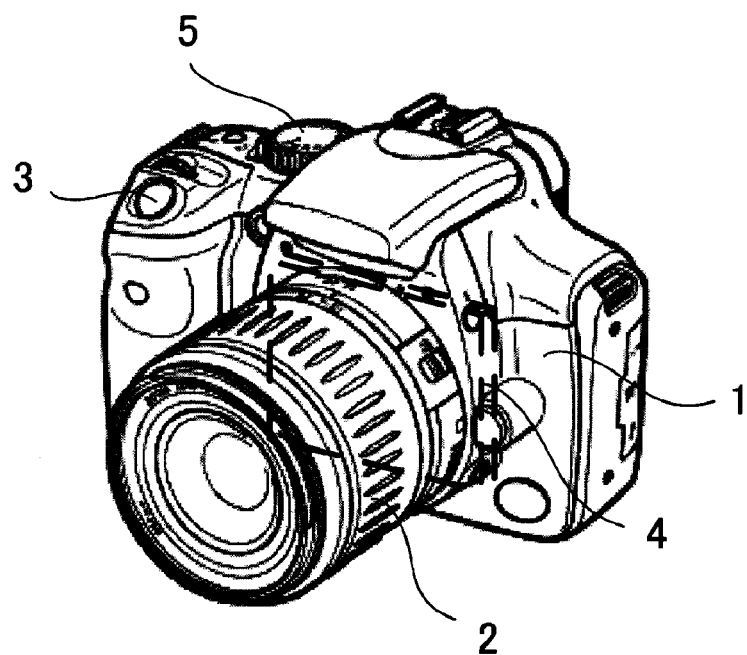
FIG. 1 is a front perspective view of a camera provided with a focal-plane shutter apparatus that is Embodiment 1 of the present invention.
Figure 2:
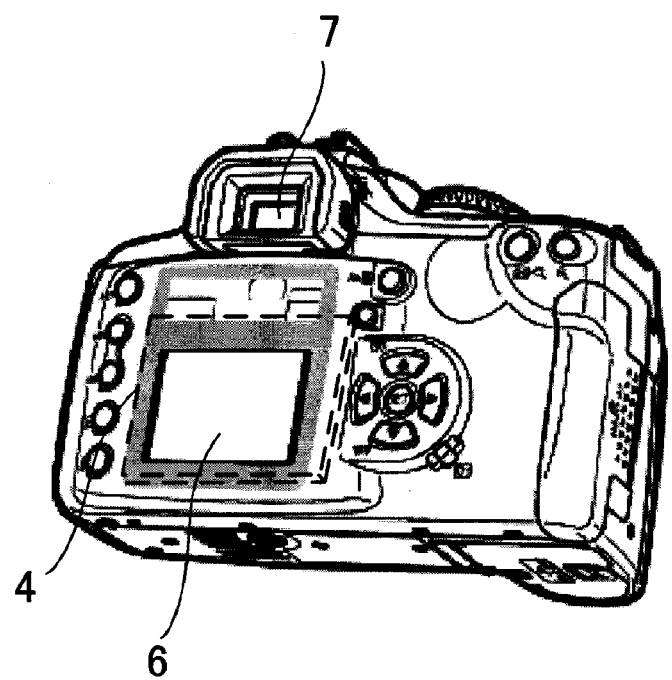
FIG. 2 is a rear perspective view of the camera of Embodiment 1.

FIGS. 1 and 2 are respectively front and rear perspective views of a single-lens reflex digital camera (image pickup apparatus) provided with a focal-plane shutter apparatus that is a first embodiment (Embodiment 1) of the present invention.

Reference numeral 1 denotes the single-lens reflex digital camera (hereinafter simply referred to as the "camera"), and reference numeral 2 denotes an image-taking lens (interchangeable lens) detachably attached to the camera 1. Reference numeral 3 denotes a release button operable by a user. On the release button 3, a first stroke operation (that is, a half-push operation, and hereinafter referred to as "SW1ON") to instruct start of photometry and AF (auto focus) and a second stroke operation (that is, a full-push operation, and hereinafter referred to as "SW2ON") thereof to instruct image capturing (exposure) can be made.

Reference numeral 4 denotes the focal-plane shutter apparatus (hereinafter simply referred to as the "shutter") that performs an opening operation and a shutting operation in response to the SW2ON to control an exposure amount of the image-pickup element, which will be described later. Reference numeral 5 denotes a mode dial switch operable by the user to switch an image capturing mode of the camera 1.

Reference numeral 6 denotes an image display part (backface monitor) that displays images and various menus. In response to the opening operation of the shutter 4 before the SW2ON (that is, before image capturing), an object image formed by the image-taking lens 2 is photoelectrically converted by the image-pickup element, and a moving image is generated based on outputs from the image-pickup element. The user can observe an object through the moving image displayed on the image display part 6. Reference numeral 7 denotes an optical viewfinder to enable the user to optically observe the object.

Figure 3:
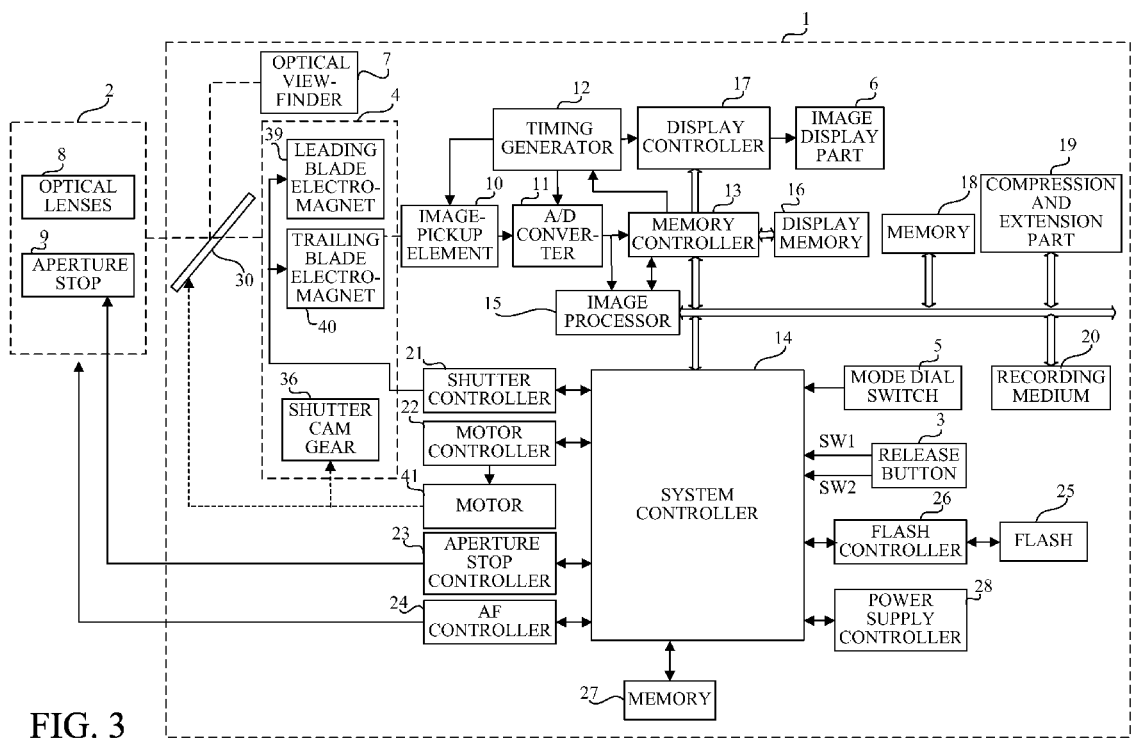
FIG. 3 is a block diagram showing an electrical configuration of the camera of Embodiment 1.

FIG. 3 shows an electrical configuration of the camera 1 and the image-taking lens 2. The image-taking lens 2 contains an image-taking optical system constituted by two or more optical lenses 8 and an aperture stop 9. Reference numeral 10 denotes the image-pickup element such as a CCD sensor or a CMOS sensor that photoelectrically converts the object image.

Reference numeral 11 denotes an A/D converter that converts an analog image-pickup signal from the image-pickup element 10 into a digital image-pickup signal. Reference numeral 12 denotes a timing generator that provides to the image-pickup element 10 and the A/D converter 11 a clock signal and a control signal. The timing generator 12 is controlled by a memory controller 13 and a system controller 14.

Reference numeral 15 denotes an image processor that performs image processing such as pixel interpolation processing and color conversion processing on the digital image-pickup signal output from the A/D converter 11 or from the memory controller 13 to generate image data. The image processor 15 performs predetermined calculation processing using the digital image-pickup signal output from the A/D converter 11, and performs TTL (through the lens) auto white balance (AWB) processing on the basis of the calculation result.

The memory controller 13 controls the A/D converter 11, the timing generator 12, the image processor 15, an image display memory 16, a display controller 17, a memory 18, and a compression and extension part 19. The image data generated by the image processor 15 on the basis of the digital image-pickup signal output from the A/D converter 11 or the memory controller 13 is stored to the image display memory 16 or the memory 18 through the memory controller 13.

The memory 18 stores the image data generated by the image capturing. The compression and extension part 19 performs compression processing of the image data read from the memory 18 according to a predetermined image compression method (for example, adaptive discrete cosine transform) and extension processing of the compressed image data, and stores the compressed or extended image data to the memory 18. The compressed or extended image data is recorded to a recording medium 20. The recording medium 20 is constituted by a nonvolatile memory such as a flash memory and is removably attached to the camera 1.

It is also possible to write the image data read from the recording medium 20 to the image display memory 16 through the image processor 15 and the memory controller 13, and to display the image data on the image display part 6 through the display controller 17.

The system controller 14 governs control of the entire camera 1. The system controller 14 is constituted by a microcomputer unit including a CPU, and executes computer programs stored in a memory 27. The system controller 14 controls the memory controller 13, the image processor 15, a shutter controller 21, a motor controller 22, an aperture stop controller 23, an AF controller 24, a flash controller 26 and a power supply controller 28.

The memory 27 stores constants, variables and computer programs used for operations of the system controller 14. The computer programs include a program for performing image capturing, a program for performing image processing, a program for recording produced image data to the recording medium 20 and a program for reading the image data from the recording medium 20.

The shutter controller 21 controls energization of a leading blade electromagnet 39 and a trailing blade electromagnet 40 according to a shutter control signal from the system controller 14. The leading blade electromagnet 39 is constituted by a leading blade coil and a leading blade yoke, and holds leading blades of the shutter 4 in a leading blade charged state (that is, a state where a leading blade driving spring, which will be described later, is charged) with an electromagnetic force generated by energization to the leading blade coil. The trailing blade electromagnet 40 is constituted by a trailing blade coil and a trailing blade yoke, and holds trailing blades of the shutter 4 in a trailing blade charged state (that is, a state where a trailing blade driving spring, which will be described later, is charged) with an electromagnetic force generated by energization to the trailing blade coil.

Reference numeral 41 denotes a motor. The motor controller 22 receives a motor control signal from the system controller 14 to control drive of the motor 41. The system controller 14 causes the motor controller 22 to drive the motor 41 in response to the operation of the release button 3, which rotates a shutter cam gear 36 that is a cam member and a quick return mirror 30 to respective predetermined positions.

The aperture stop controller 23 controls the aperture stop 9 to adjust an amount of light reaching the image-pickup element 10. The AF controller 24 controls focusing of the image-taking lens 2 (that is, movement of a focus lens included in the image-taking lens 2) according to an AF control signal (movement amount information on the focus lens) from the system controller 14. Reference numeral 25 denotes a flash that emits light to illuminate the object. The flash controller 26 controls light emission of the flash 25.

The power supply controller 28 performs a determination of whether or not a battery as a power supply is installed, a determination of a kind of the battery, a determination of a battery remaining amount, or the like. The power supply controller 28 supplies a necessary voltage to each part in the camera 1 and the image-taking lens 2 for a necessary time period according to results of the determinations and instructions from the system controller 14.

Figure 4:
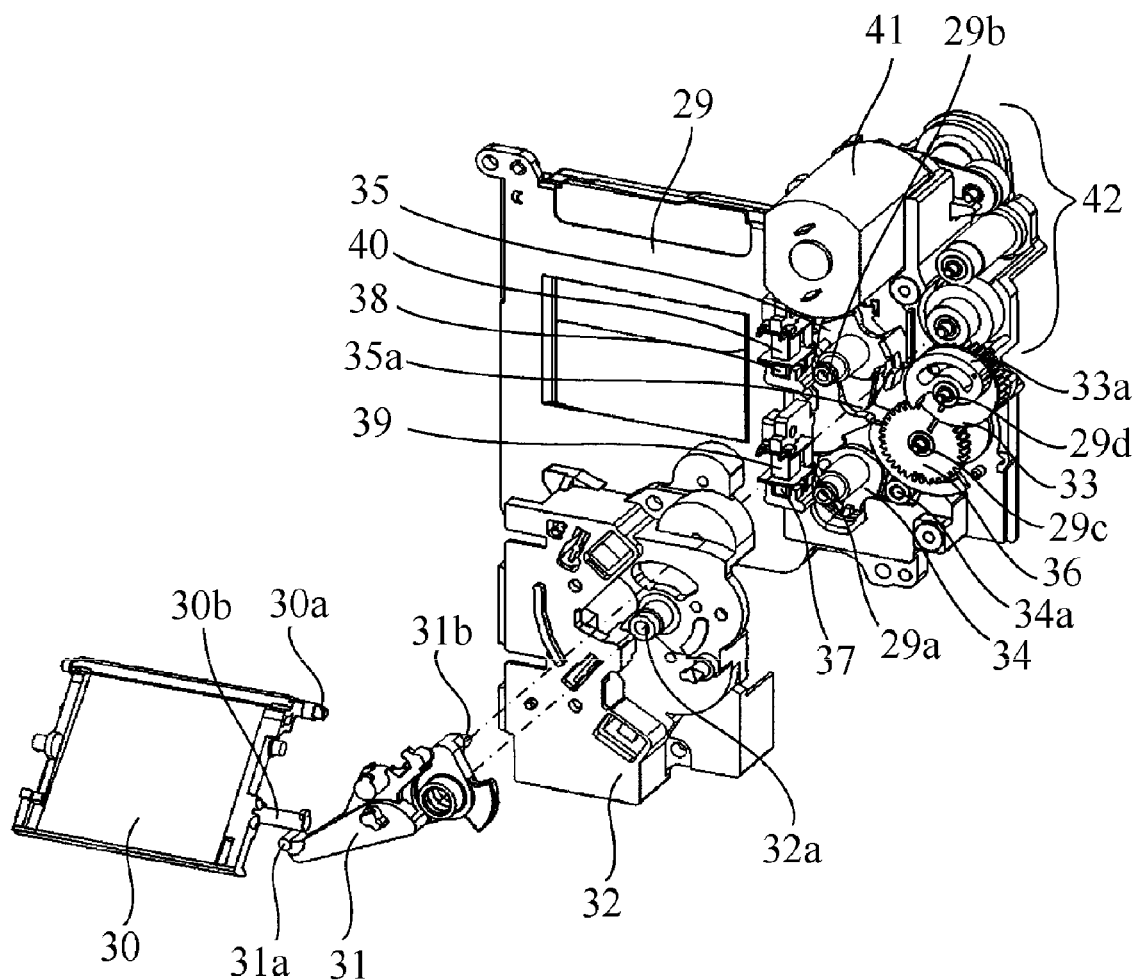
FIG. 4 is an exploded perspective view showing the shutter apparatus and a quick return mirror in Embodiment 1.

FIG. 4 is an exploded perspective view showing the shutter 4 and the quick return mirror 30. A shutter base plate 29 that is a base member of the shutter 4 is fixed to a mirror box constituting a camera body (not shown). Parts constituting a driving mechanism for the leading blades and the trailing blades are mounted on the shutter base plate 29.

The quick return mirror 30 rotates about a boss 30*a* downward and upward in the mirror box to move into and out of an image-taking optical path. A mirror driving lever 31 that is a mirror driving member is rotatable about a boss 32*a* formed on a magnet base plate 32, and has a driving portion 31*a* making contact with a driven portion 30*b* of the quick return mirror 30, the driven portion 30*b* being provided at a position lower than the image-taking optical path. Further, the mirror driving lever 31 makes contact with a cam surface 33*a* of a mirror cam gear 33 at a cam contact portion 31*b*. The quick return mirror 30 is urged by a mirror-up spring (not shown) so as to be moved to follow the movement of the mirror driving lever 31.

A leading blade driving lever 34 that is a leading blade driving member and a trailing blade driving lever 35 that is a trailing blade driving member are respectively attached to a leading blade boss 29*a* and a trailing blade boss 29*b* formed on the shutter base plate 29 so as to be rotatable thereabout. Between the leading blade boss 29*a* and the trailing blade boss 29*b*, a shutter cam gear 36 is attached to a shutter cam gear boss 29*c* so as to be rotatable thereabout, the shutter cam gear boss 29*c* being formed on the shutter base plate 29 and located on a side opposite to an image-taking optical axis with respect to a line (a dashed line in FIG. 5) connecting the leading blade boss 29*a* and the trailing blade boss 29*b*.

A leading blade charging roller 34*a* that is a follower portion provided to the leading blade driving lever 34 and a trailing blade charging roller 35*a* that is a follower portion provided to the trailing blade driving lever 35 respectively make contact with two cam surfaces including a leading blade cam and a trailing blade cam formed on the shutter cam gear 36.

Moreover, the leading blade driving lever 34 and the trailing blade driving lever 35 are respectively provided with a leading blade armature 37 and a trailing blade armature 38. The leading blade armature 37 and the trailing blade armature 38 are respectively attracted by electromagnetic forces generated by energization of the leading blade electromagnet 39 and the trailing blade electromagnet held by the magnet base plate 32. The leading blade electromagnet 39 and the leading blade armature constitute a leading blade electromagnetic holding mechanism, and the trailing blade electromagnet 40 and the trailing blade armature 38 constitute a trailing blade electromagnetic holding mechanism.

In addition, the mirror cam gear 33 is attached to a mirror cam gear boss 29d so as to be rotatable thereabout, the mirror cam gear boss 29d being formed on the shutter base plate 29 so as to extend parallel to the image-taking optical axis. The mirror cam gear 33 directly engages with the shutter cam gear 36. A driving force generated by the motor 41 having an output shaft extending parallel to the image-taking optical axis rotates the mirror driving lever 31 and the shutter cam gear 36 in one direction, respectively, through reduction gears 42 and the mirror cam gear 33 that are driving power transmission members.

The rotation of the mirror driving lever 31 and the shutter cam gear 36 causes the quick return mirror 30 to rotate (that is, to move into and out of the image-taking optical path) and then causes the shutter 4 to perform a charging operation and a charge releasing operation (that is, causes the leading and trailing driving levers 34 and 35 to rotate from a charge completion position to a blade drive standby position).

Next, description will be made of a configuration of the shutter 4 with reference to FIGS. 5 to 10 and 12. FIGS. 5, 7 to 10 and 12 show a right half part of the shutter 4 incorporated in the camera 1, which is viewed from an object side. In these figures, the magnet base plate 32 is omitted. FIG. 6 is a right side view of the shutter 4 shown in FIG. 5, which omits some parts.

Figure 5:
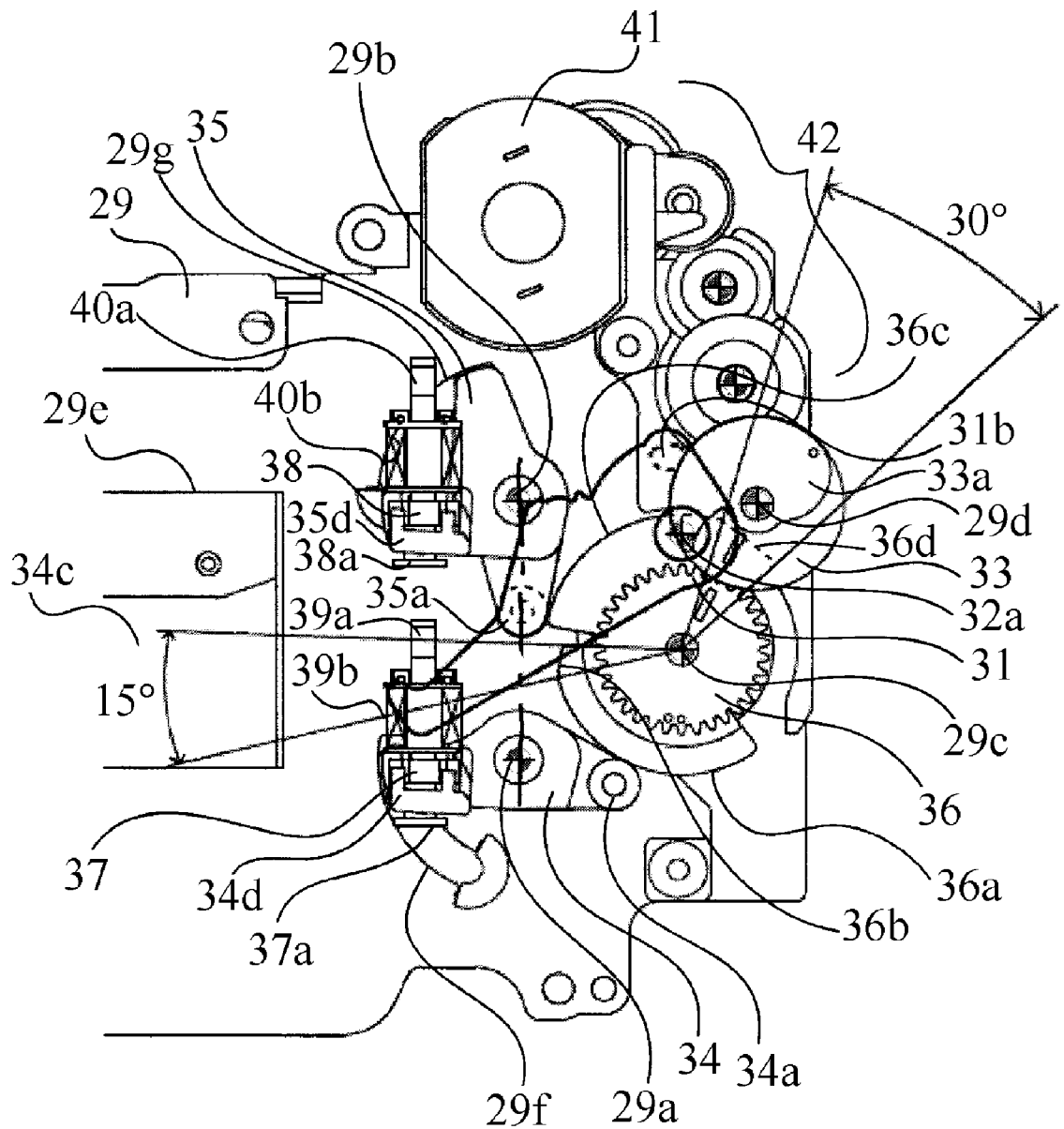
FIG. 5 is a front view of the shutter apparatus of Embodiment 1 in a charge completion state.
Figure 6:
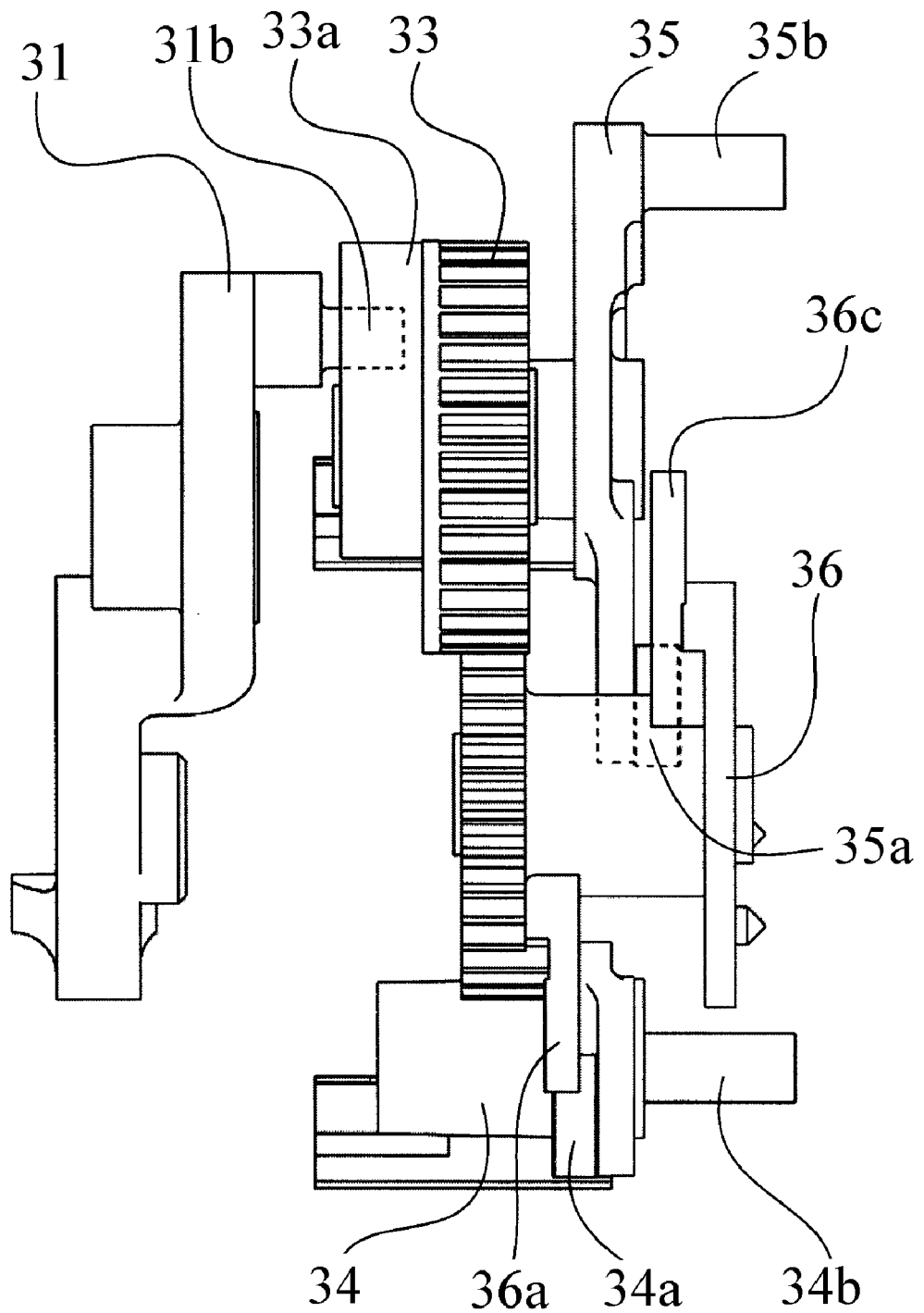
FIG. 6 is a side view of the shutter apparatus of Embodiment 1 in the charge completion state.
Figure 7:
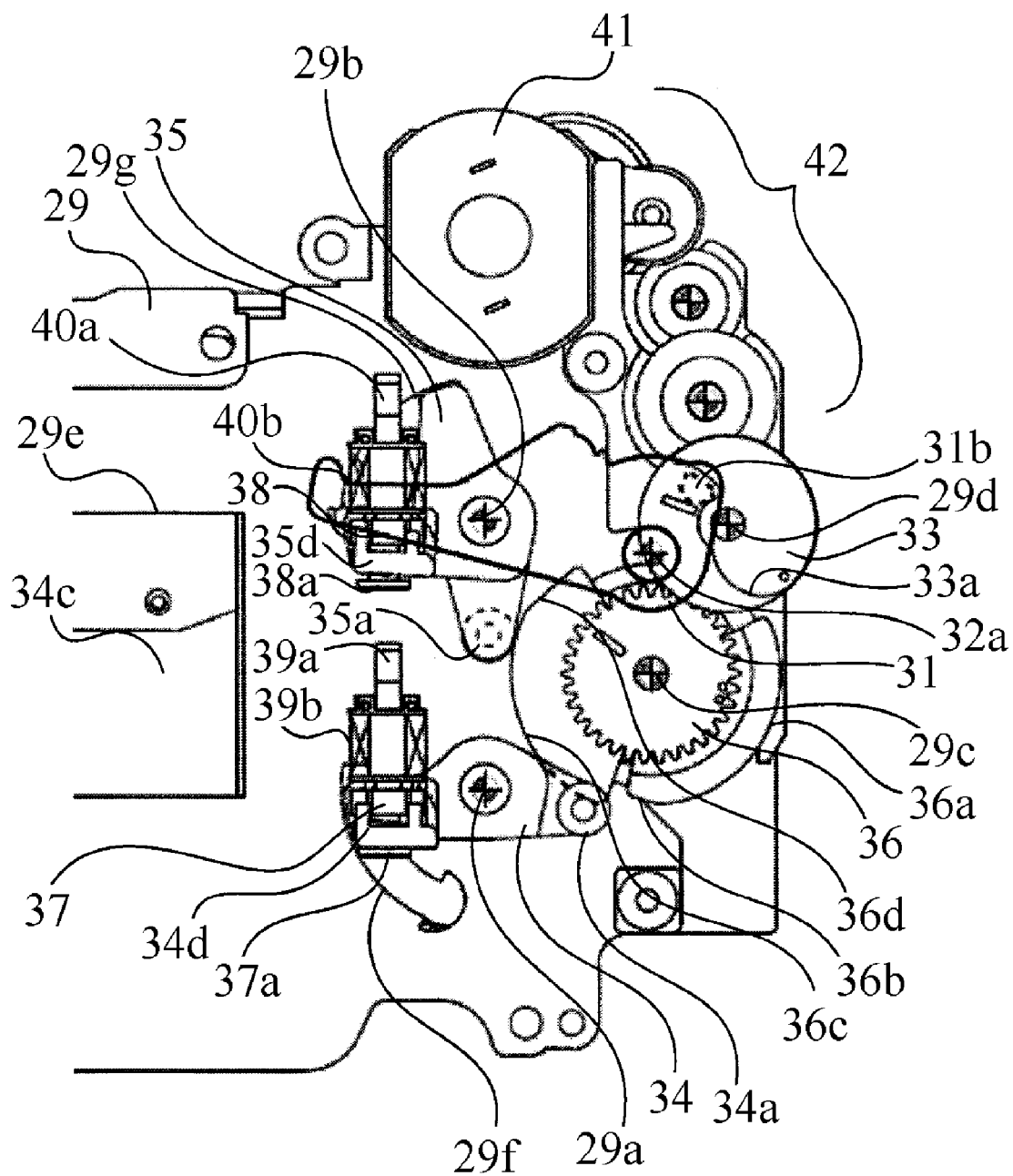
FIG. 7 is a front view of the shutter apparatus of Embodiment 1 in a live-view standby state.
Figure 8:
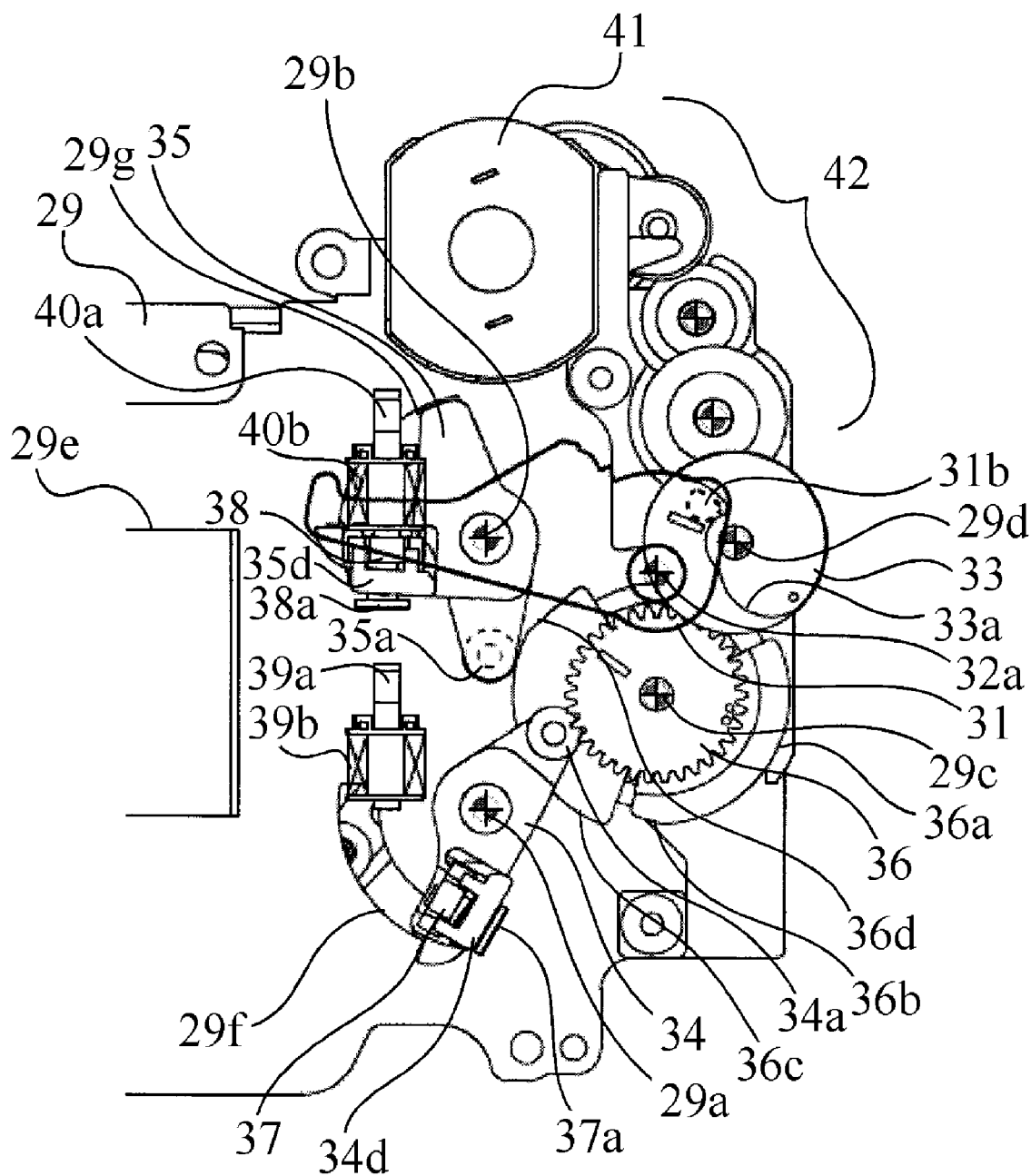
FIG. 8 is a front view of the shutter apparatus of Embodiment 1 in a live-view display state.
Figure 9:
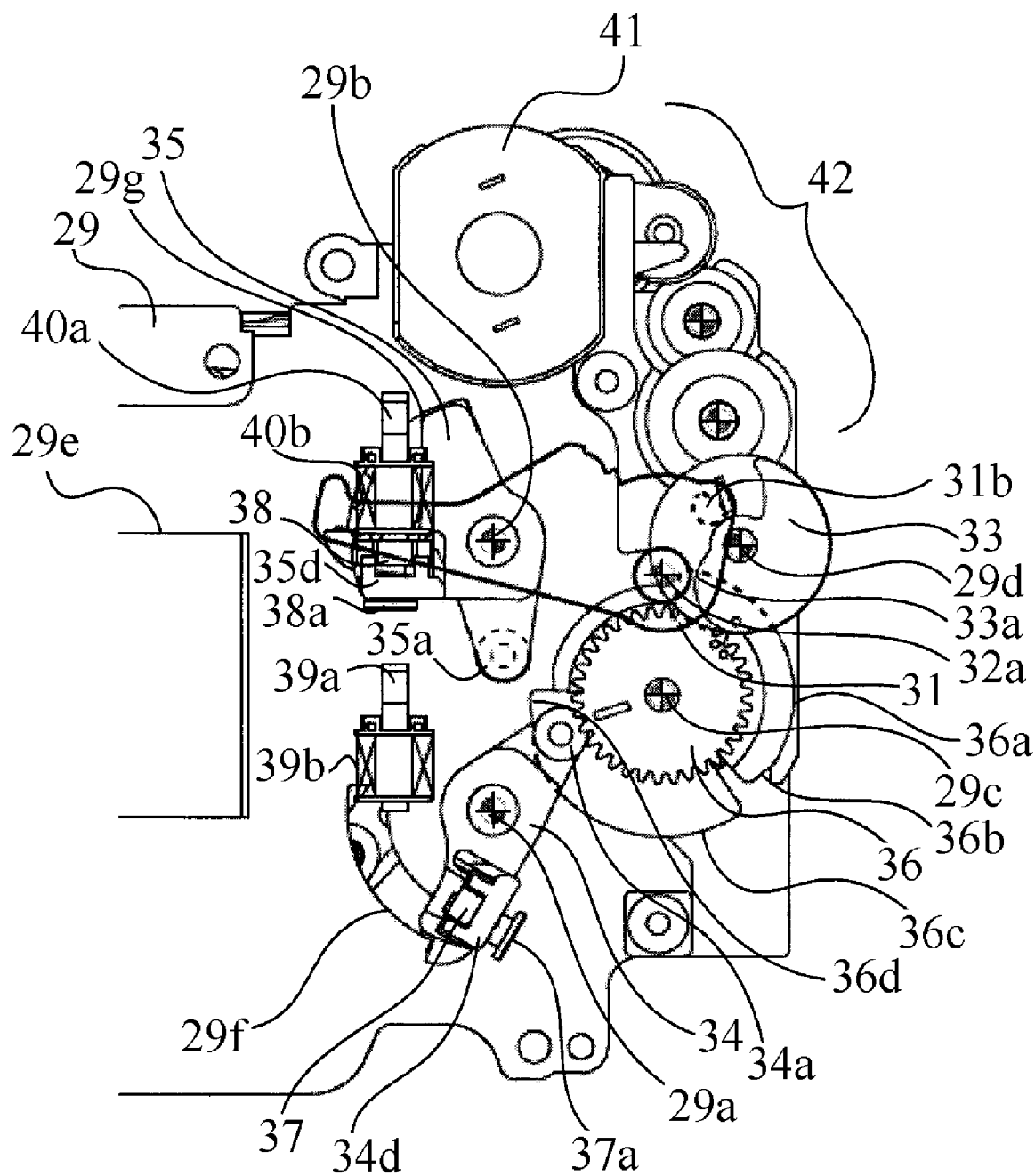
FIG. 9 is a front view of the shutter apparatus of Embodiment 1 in a leading blade movement completion state.
Figure 10:
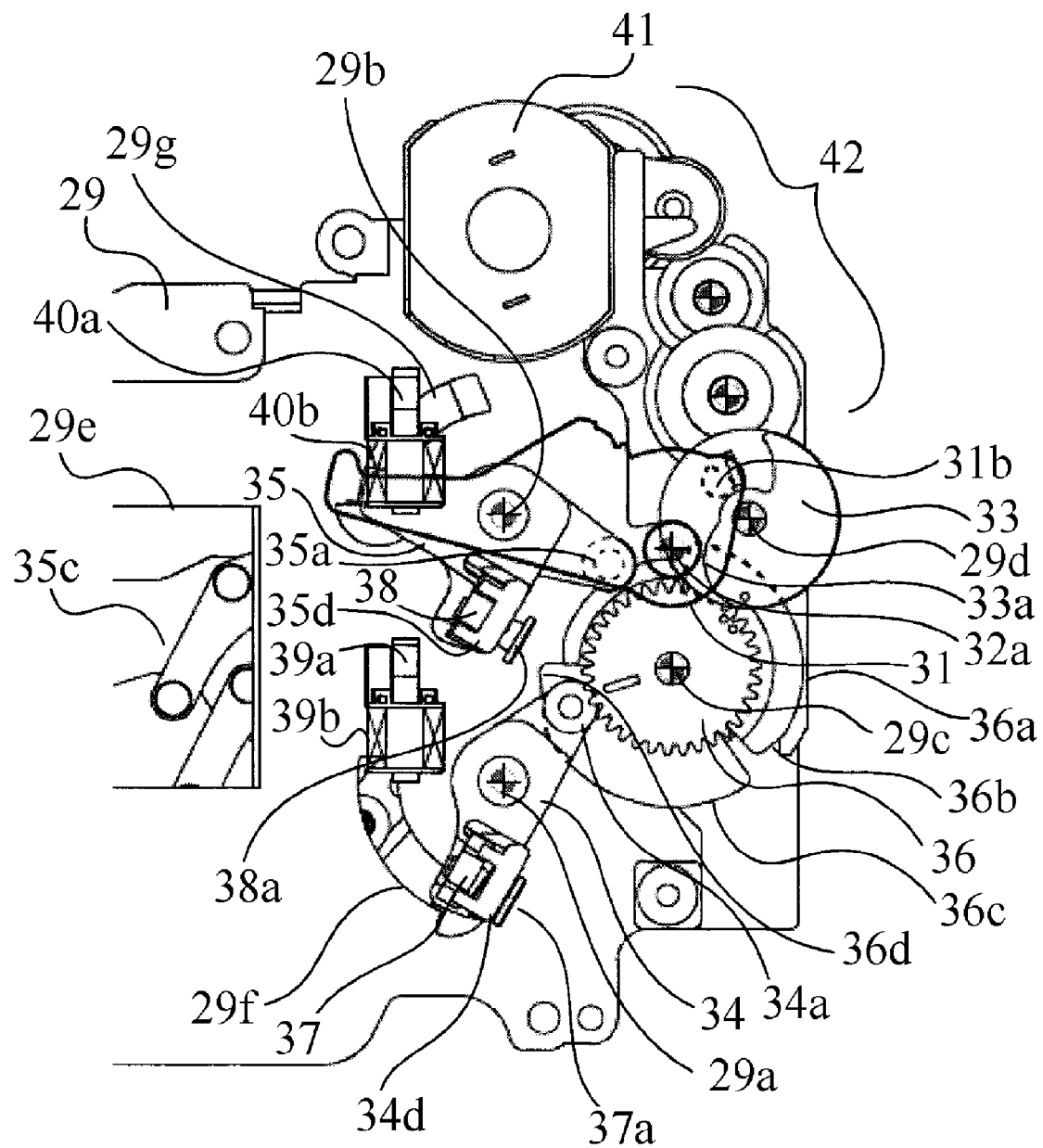
FIG. 10 is a front view of the shutter apparatus of Embodiment 1 in a trailing blade movement completion state.
Figure 12:
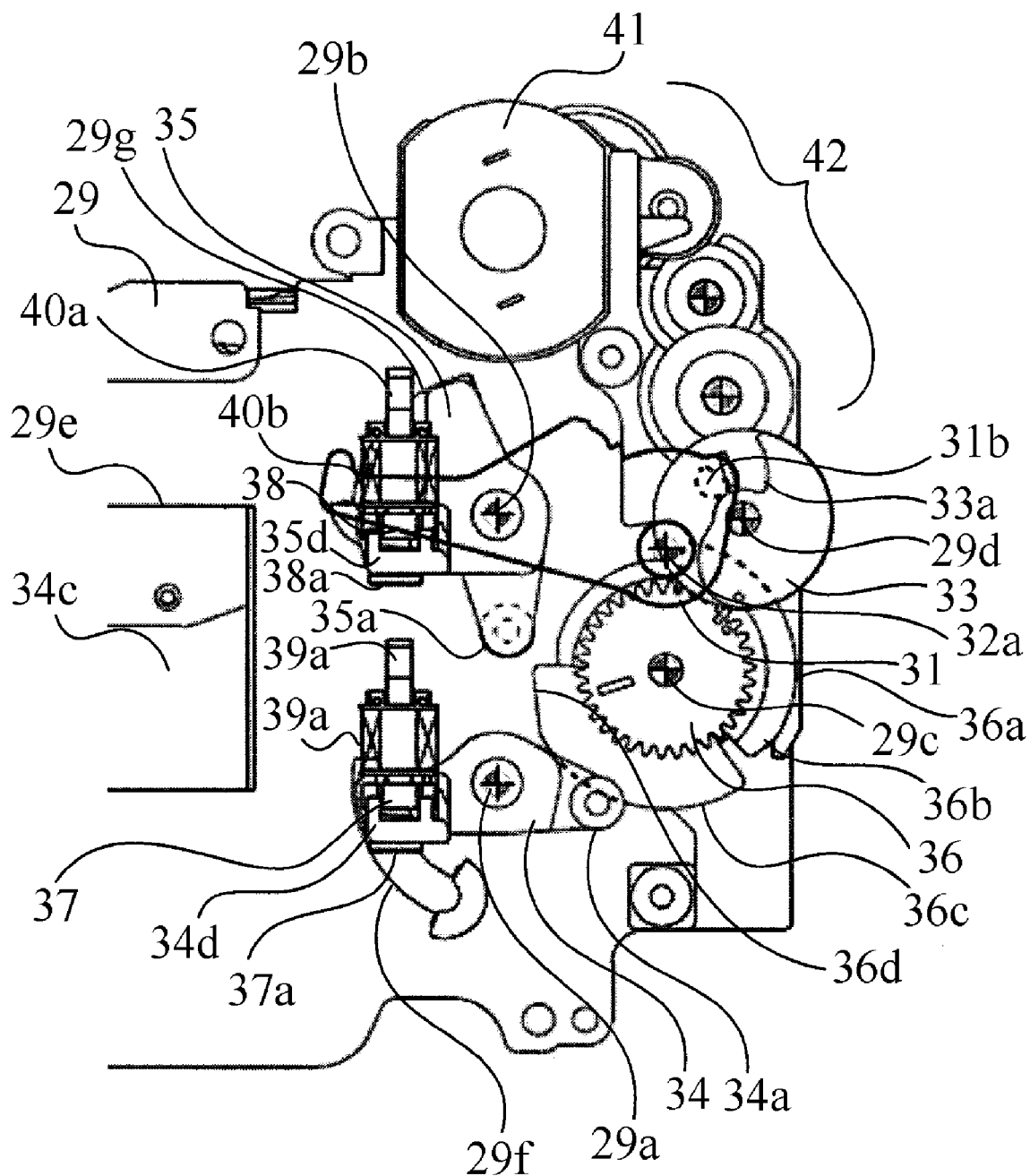
FIG. 12 is a front view of the shutter apparatus of Embodiment 1 in a blade movement standby state.

FIG. 5 shows an overcharged state in which operations of the camera 1 are stopped (that is, a charge completion state where the leading blade driving lever 34 and the trailing blade driving lever 35 are located at the charge completion position). FIG. 7 shows a live-view standby state corresponding to a blade movement standby state of the leading blades 34c and a blade drive standby state where the leading blade driving lever 34 is located at the blade drive standby position. FIG. 8 shows a live-view display state, FIG. 9 shows a leading blade movement completion state, FIG. 10 shows a trailing blade movement completion state and FIG. 12 shows the blade movement standby state.

The shutter base plate 29 is provided with various parts constituting the driving mechanism for driving the leading blades 34c and the trailing blades 35c. Reference numeral 29e denotes an aperture formed in the shutter base plate 29 as an opening through which a light flux from the object passes.

The leading blade driving lever 34 is rotatably attached to the leading blade boss 29a formed on the shutter base plate 29. A leading blade driving spring (not shown) that is a leading blade urging member and is constituted by a torsion coil spring is disposed around the leading blade boss 29a. The leading blade driving spring urges the leading blade driving lever 34 in a counterclockwise direction in FIG. 5 that is a driving direction of the leading blade driving lever 34 (direction to move the leading blades 34c).

At a tip of the leading blade driving lever 34, a leading blade driving pin 34b is formed. The leading blade driving pin 34b penetrates through a leading blade groove portion 29f formed in the shutter base plate 29 to engage with a leading blade driving arm (not shown). The leading blade driving arm is connected to the leading blades 34c through a link mechanism. The leading blades 34c are constituted by plural light-blocking blades.

The movement of the leading blade driving pin 34b along the leading blade groove portion 29f with the rotation of the leading blade driving lever 34 rotates the leading blade driving arm, which unfolds the leading blades 34c so as to shut the aperture 29e and folds (overlaps) them so as to open the aperture 29e. A state where the leading blades 34c shut the aperture 29e (that is, a state where the light flux from the object is blocked) is hereinafter referred to as a "shut state of the leading blades 34c". A state where the leading blades 34c open the aperture 29e (that is, a state allowing the light flux from the object to pass) is hereinafter referred to as an "opened state of the leading blades 34c". The leading blade driving lever 34 rotates within a rotation area limited by the leading blade groove portion 29f.

As shown in FIG. 5, the leading blade driving lever 34 has a leading blade armature supporting portion 34d. The leading blade armature supporting portion 34d has a through-hole portion (not shown) with which a leading blade armature pin 37a that is integrally provided to the leading blade armature 37 and has a flange portion whose outer diameter is larger than an inner diameter of the through-hole portion. The leading blade armature pin 37a extends in a direction orthogonal to an attracting surface of the leading blade armature 37.

Between the leading blade armature 37 and the leading blade armature supporting portion 34d, a compression spring (not shown) is disposed around the leading blade armature pin 37a. The compression spring urges the leading blade armature 37 and the leading blade armature supporting portion 34d in a direction (vertical direction in FIG. 5) separating them from each other.

The leading blade electromagnet 39 is constituted by the leading blade yoke 39a and the leading blade coil 39b disposed around the leading blade yoke 39a. Energizing the leading blade coil 39b generates an electromagnetic force on the leading blade yoke 39a, and the electromagnetic force enables the leading blade electromagnet 39 to attract the leading blade armature 37.

The trailing blade driving lever 35 is rotatably attached to the trailing blade boss 29b formed on the shutter base plate 29. A trailing blade driving spring (not shown) that is a trailing blade urging member and is constituted by a torsion coil spring is disposed around the trailing blade boss 29b. The trailing blade driving spring urges the trailing blade driving lever 35 in a counterclockwise direction in FIG. 5 that is a driving direction of the trailing blade driving lever 35 (direction to move the trailing blades 35c).

At a tip of the trailing blade driving lever 35, a trailing blade driving pin 35b is formed. The trailing blade driving pin 35b penetrates through a trailing blade groove portion 29g formed in the shutter base plate 29 to engage with a trailing blade driving arm (not shown). The trailing blade driving arm is connected to the trailing blades 35c through a link mechanism. The trailing blades 35c overlap each other in FIGS. 5, 7 to 9 and 12. The trailing blades 35c are constituted by plural light-blocking blades.

The movement of the trailing blade driving pin 35b along the trailing blade groove portion 29g with the rotation of the trailing blade driving lever rotates the trailing blade driving arm, which unfolds the trailing blades 35c so as to shut the aperture 29e and folds (overlaps) them so as to open the aperture 29e. A state where the trailing blades 35c shut the aperture 29e (that is, a state where the light flux from the object is blocked) is hereinafter referred to as a "shut state of the trailing blades 35c". A state where the trailing blades 35c open the aperture 29e (that is, a state allowing the light flux from the object to pass) is hereinafter referred to as an "opened state of the trailing blades 35c". The trailing blade driving lever 35 rotates within a rotation area limited by the trailing blade groove portion 29g.

The trailing blade driving lever 35 is provided with a trailing blade armature supporting portion 35d. The trailing blade armature supporting portion 35d has a through-hole portion (not shown) with which a trailing blade armature pin 38a that is integrally provided to the trailing blade armature 38 and has a flange portion whose outer diameter is larger than an inner diameter of the through-hole portion. The trailing blade armature pin 38a extends in a direction orthogonal to an attracting surface of the trailing blade armature 38.

Between the trailing blade armature 38 and the trailing blade armature supporting portion 35d, a compression spring (not shown) is disposed around the trailing blade armature pin 38a. The compression spring urges the trailing blade armature 38 and the trailing blade armature supporting portion 35d in a direction (vertical direction in FIG. 5) separating them from each other.

The trailing blade electromagnet 40 is constituted by the trailing blade yoke 40a and the trailing blade coil 40b disposed around the trailing blade yoke 40a. Energizing the trailing blade coil 40b generates an electromagnetic force on the trailing blade yoke 40a, and the electromagnetic force enables the trailing blade electromagnet 40 to attract the trailing blade armature 38.

The shutter cam gear 36 is attached to a shutter cam gear boss 29c formed on the shutter base plate 29 so as to be rotatable thereabout. A leading blade cam portion 36a and a leading blade cam inclination portion 36b formed on the shutter cam gear 36 make contact with the leading blade charging roller 34a provided to the leading blade driving lever 34, and rotate the leading blade driving lever 34 with the rotation of the shutter cam gear 36. The leading blade cam portion 36a and the leading blade cam inclination portion 36b constitute the leading blade cam.

Specifically, the leading blade cam portion 36a of the shutter cam gear 36 rotates the leading blade driving lever 34 that has completed the movement of the leading blades 34c (that is, that has overlapped the leading blades 34c) in a clockwise direction (charging direction) in FIG. 5 to charge the leading blade driving spring. This operation for charging the leading blade driving spring is hereinafter referred to as the "charging operation of the leading blades 34c (or the charging operation of the leading blade driving lever 34)".

The leading blade cam inclination portion 36b gradually rotates the leading blade driving lever 34 that has completed the charging operation of the leading blades 34c (that is, that has unfolded the leading blades 34c) in the counterclockwise direction in FIG. 5. Thereby, the leading blade driving lever 34 gradually moves to the blade drive standby state. Providing such a leading blade cam inclination portion 36b reduces an impact generated between the leading blade electromagnet 39 and the leading blade armature 37 due to the urging force of the charged leading blade driving spring when the leading blade driving lever 34 moves to the blade drive standby state (hereinafter referred to as "at a charge releasing operation of the leading blade driving lever 34"). This makes it possible to prevent separation of the leading blade armature 37 from the leading blade electromagnet 39.

A trailing blade cam portion 36c and a trailing blade cam inclination portion 36d formed on the shutter cam gear 36 make contact with the trailing blade charging roller 35a provided to the trailing blade driving lever 35, and rotate the trailing blade driving lever 35 with the rotation of the shutter cam gear 36. The trailing blade cam portion 36c and the trailing blade cam inclination portion 36d constitute the trailing blade cam.

Specifically, the trailing blade cam portion 36c of the shutter cam gear 36 rotates the trailing blade driving lever 35 that has completed the movement of the trailing blades 35c (that is, that has unfolded the trailing blades 35c) in the clockwise direction in FIG. 5 to charge the trailing blade driving spring. This operation for charging the trailing blade driving spring is hereinafter referred to as the "charging operation of the trailing blades 35c (or charging operation of the trailing blade driving lever 35)".

The trailing blade cam inclination portion 36d gradually rotates the trailing blade driving lever that has completed the charging operation of the trailing blades 35c (that is, that has overlapped the trailing blades 35c) in the counterclockwise direction in FIG. 5. Thereby, the trailing blade driving lever 35 gradually moves to the blade drive standby state. Providing such a trailing blade cam inclination portion 36d reduces an impact generated between the trailing blade electromagnet 40 and the trailing blade armature 38 due to the urging force of the charged trailing blade driving spring when the trailing blade driving lever 35 moves to the blade drive standby state (hereinafter referred to as "at a charge releasing operation of the trailing blade driving lever 35"). This makes it possible to prevent separation of the trailing blade armature 38 from the trailing blade electromagnet 40.

In a rotational direction of the shutter cam gear 36, an angular area where the leading blade cam inclination portion 36b is formed on the shutter cam gear 36 is smaller than an angular area where the trailing blade cam inclination portion 36d is formed thereon. The angular area is an area in the rotational direction of the shutter cam gear 36 between lines connecting a center of the shutter cam gear 36 and both ends of each blade cam inclination portion. In this embodiment, the angular area of the leading blade cam inclination portion 36b is set to 15 degrees, and the angular area of the trailing blade cam inclination portion 36d is set to 30 degrees.

Such setting of the angular areas makes a distance where the leading blade charging roller 34a moves along the leading blade cam inclination portion 36b shorter than that where the trailing blade charging roller 35a moves along the trailing blade cam inclination portion 36d, which enables reduction of a release time lag (a more detailed description will be made later).

The mirror driving lever 31 is attached to the boss 32a formed on the magnet base plate 32 so as to be rotatable thereabout. The mirror-up spring (not shown) constituted by a torsion coil spring is disposed around the boss 32a. The mirror-up spring urges the mirror driving lever 31 in the clockwise direction in FIG. 5, that is, in a direction causing the quick return mirror 30 to move upward (in other words, to move out of the image-taking optical path).

The mirror cam gear 33 is attached to the mirror cam gear boss 29d formed on the shutter base plate 29 so as to be rotatable thereabout. The mirror cam gear 33 directly engages with the shutter cam gear 36.

A cam surface 33a formed on the mirror cam gear 33 makes contact with the cam contact portion 31b formed on the mirror driving lever 31 with rotation of the mirror cam gear 33, which rotates the mirror driving lever 31.

Specifically, the cam surface 33a of the mirror cam gear 33 rotates the mirror driving lever 31 in the counterclockwise direction in FIG. 5 from a state where the quick return mirror 30 is located at its up position to charge the mirror-up spring (that is, the quick return mirror 30). This charging operation of the mirror-up spring is performed by transmission of the rotational force of the motor 41 to the mirror cam gear 33 and the shutter cam gear 36 through the reduction gears 42.

Next, description will be made of the operations of the shutter 4. First, description will be made of an operation of the shutter 4 in a live-view mode in which the camera 1 performs image capturing from the live-view display state in response to the SW2ON with reference to FIGS. 5 and 7 to 11.

In response to selection of the live-view mode through the mode dial switch 5 in the charge completion state shown in FIG. 5, the system controller 14 starts the energization to the leading blade coil 39b and rotates motor 41. The rotation of the motor 41 causes the mirror cam gear 33 to rotate in the clockwise direction and causes the shutter cam gear 36 to rotate in the counterclockwise direction. The rotation of the mirror cam gear 33 causes the cam contact portion 31b of the mirror driving lever 31 to drop to a bottom of the cam surface 33a (that is, the rotation of the mirror cam gear 33 shifts the state into a cam bottom state) as shown in FIG. 7, and thereby the mirror driving lever 31 rotates the quick return mirror 30 upward.

The leading blade charging roller 34a provided to the leading blade driving lever 34 shifts from a state of making contact with the leading blade cam portion 36a of the shutter cam gear 36 into a state of making contact with the leading blade cam inclination portion 36b. With this shift, the charge releasing operation of the leading blade driving lever 34 is performed, and the leading blade driving lever 34 gradually moves to the blade drive standby state. In the blade drive standby state, the system controller 14 stops the motor 41. On the other hand, the trailing blade charging roller 35a provided to the trailing blade driving lever 35 is in contact with the trailing blade cam portion 36c.

Cut-off of the energization to the leading blade coil 39b in the live-view standby state shown in FIG. 7 allows the leading blade driving lever 34 that is urged by the urging force of the leading blade driving spring to move the leading blades 34c to a position corresponding to the live-view display state shown in FIG. 8. In the live-view display state, the trailing blade charging roller 35a is in contact with the trailing blade cam portion 36c, so that the energization to the trailing blade coil 40b is unnecessary, which enables reduction of power consumption.

In the live-view display state, a moving image corresponding to an object image formed on the image-pickup element 10 is displayed on the image display part 6.

In response to the full-push operation of the release button 3 (SW2ON) in the live-view display state, the system controller 14 starts the energization to the trailing blade coil 40b and rotates the motor 41. The rotation of the motor 41 causes the mirror cam gear 33 to rotate in the clockwise direction and causes the shutter cam gear 36 to rotate in the counterclockwise direction, and thereby the state shifts to the leading blade movement completion state shown in FIG. 9.

Thereafter, the system controller 14 performs exposure (charge accumulation) of the image-pickup element 10 during a charge accumulation time corresponding to a shutter speed set based on a photometry result (accumulation of charge). Then, the system controller 14 cuts off the energization to the trailing blade coil 40b, which causes the state to shift into the trailing blade movement completion state shown in FIG. 10. This image capturing method is referred to as hybrid image capturing.

After the exposure of the image-pickup element 10, the system controller 14 rotates the motor 41 to perform the charging operation. Then, the state shifts the states shown in FIGS. 5 and 7 to return to the live-view display state shown in FIG. 8.

Figure 11:
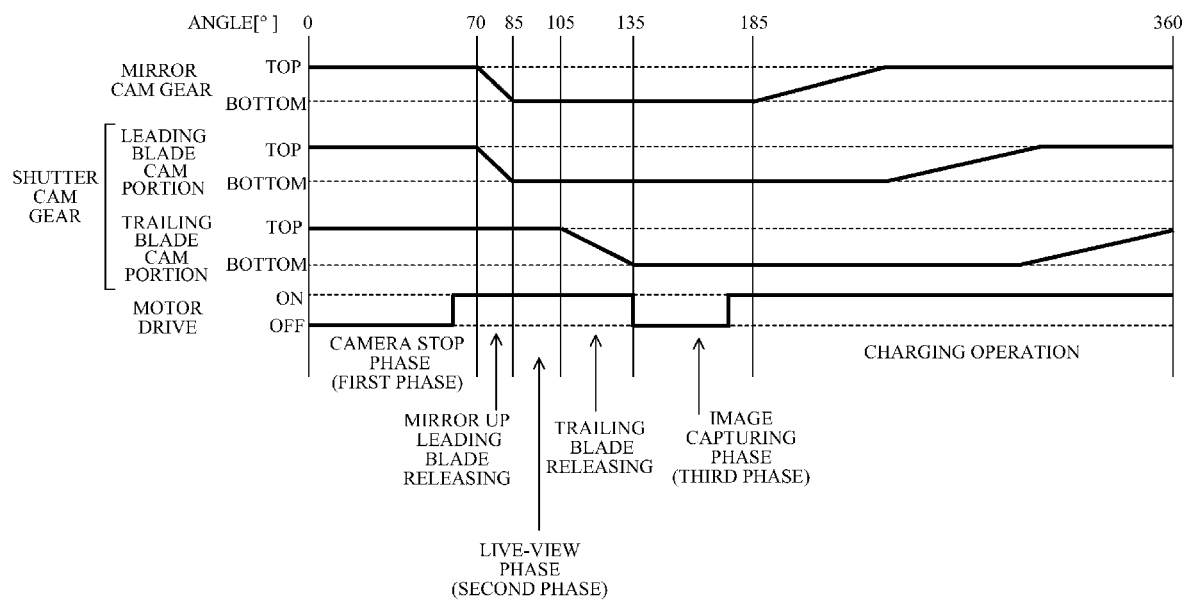
FIG. 11 shows a shape of a cam included in the shutter apparatus of Embodiment 1.

FIG. 11 shows cam shapes (cam diagrams) of the mirror cam gear 33 and the shutter cam gear 36 and drive timings of the motor 41. A camera stop phase (first phase) shown in FIG. 5 corresponds to a phase area of 0 to 70 degrees in the cam diagram where the cam surface 33a of the mirror cam gear 33 and the leading and trailing blade cam portions 36a and 36c of the shutter cam gear 36 are in cam top states where the mirror driving lever 31 and the leading and trailing blade driving levers 34 and 35 are in contact with their cam tops.

In response to the rotation of each cam gear from a phase of 70 degrees to a phase of 85 degrees in the cam diagram, the cam surface 33a of the mirror cam gear 33 retracts from a rotation area of the cam contact portion 31b of the mirror driving lever 31, which allows the quick return mirror 30 to perform the mirror-up operation. Moreover, the leading blade cam inclination portion 36b of the shutter cam gear 36 retracts from a rotation area of the leading blade charging roller 34a, which allows the charge releasing operation of the leading blade driving lever 34 (hereinafter also simply referred to as the "leading blade releasing"). This causes each cam gear to rotate to a live-view phase (second phase) corresponding to a phase area of 85 to 105 degrees in the cam diagram.

In response to the rotation of the shutter cam gear 36 from a phase of 105 degrees to a phase of 135 degrees, the trailing blade cam inclination portion 36d of the shutter cam gear 36 retracts from a rotation area of the trailing blade charging roller 35a, which allows the charge releasing operation of the trailing blade driving lever 35 (hereinafter also simply referred to as the "trailing blade releasing"). This causes each cam gear to rotate from the live-view phase to an image capturing phase (third phase) corresponding to a phase area of 135 to 185 degrees in the cam diagram. Each cam gear sequentially rotates from a cam bottom state where the mirror driving lever 31 and the leading and trailing blade driving levers 34 and 35 are in contact with their cam bottoms to the cam top state in a phase area of 185 to 360 degrees to perform the charging operation.

If a voltage to be applied to the motor 41 when the phase directly shifts from the camera stop phase to the image capturing phase is equal to that to be applied thereto when the phase shifts from the camera stop phase to the live-view phase, it is necessary for the live-view phase to have a nearly equal angular width to that for the image capturing phase.

On the other hand, this embodiment sets the voltage to be applied to the motor 41 when the phase shifts from the camera stop phase to the live-view phase lower than that to be applied thereto when the phase directly shifts from the camera stop phase to the image capturing phase. Such setting of the voltage reduces overrun of each cam gear when each cam gear is stopped at the live-view phase, which enables reduction of the angular width for the live-view phase. Accordingly, the angular width from the camera stop phase to the image capturing phase (70 to 135 degrees) is set smaller as compared when the voltage to be applied to the motor 41 is not changed, which makes it possible to suppress increase of the release time lag in normal image capturing. The voltage to be applied to the motor 41 may be reduced by lowering an effective voltage to be applied thereto with heretofore known PWM control.

Next, description will be made of an operation of the shutter 4 in a normal image capturing mode in which image capturing is performed while the object is observed through the optical viewfinder 7 with reference to FIGS. 5, 7, 9, 10 and 12.

In response to the full-push operation of the release button 3 in the charge completion state shown in FIG. 5, the system controller 14 starts the energization to the leading blade coil 39b and the trailing blade coil 40b. With this energization, the system controller 14 rotates the motor 41 to rotate the mirror cam gear 33 in the clockwise direction and rotate the shutter cam gear 36 in the counterclockwise direction. The rotation of the mirror cam gear 33 causes the cam contact portion 31b of the mirror driving lever 31 to drop to the bottom of the cam surface 33a (that is, the rotation of the mirror cam gear 33 shifts the state into the cam bottom state), and thereby the mirror driving lever 31 rotates the quick return mirror 30 upward.

The leading blade charging roller 34a shifts from the state of making contact with the leading blade cam portion 36a of the shutter cam gear 36 into the state of making contact with the leading blade cam inclination portion 36b. The leading blade cam inclination portion 36b causes the leading blade driving lever 34 to gradually rotate to the blade drive standby position as shown in FIG. 7. In FIG. 7, since the leading blade armature 37 is electromagnetically attracted and held, the leading blade driving lever 34 is not rotated.

Then, the trailing blade charging roller 35a shifts from the state of making contact with the trailing blade cam portion 36c of the shutter cam gear 36 into the state of making contact with the trailing blade cam inclination portion 36d. The trailing blade cam inclination portion 36d causes the trailing blade driving lever 35 to gradually rotate to the blade drive standby position as shown in FIG. 12, and then the system controller 14 stops the motor 41. In FIG. 12, since the trailing blade armature 38 is electromagnetically attracted and held, the trailing blade driving lever 35 is not rotated.

Figure 13:
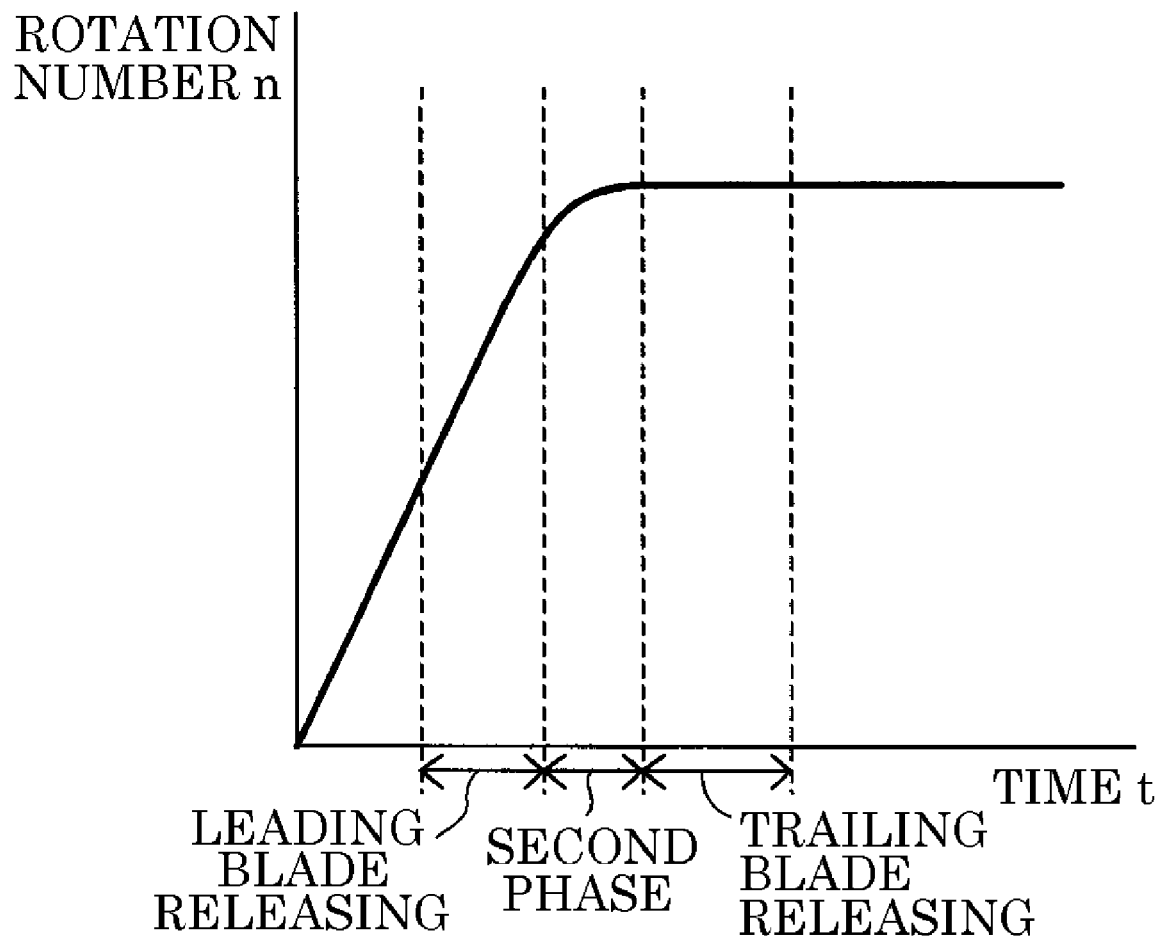
FIG. 13 shows a relationship of a driving time and a rotational speed of the motor included in the shutter apparatus of Embodiment 1.

In the normal image capturing mode, the motor continuously rotates from the first phase to the third phase in the cam diagram shown in FIG. 11. FIG. 13 shows change with time of a rotation number (rotation speed) of the motor 41. Moreover, FIG. 13 shows timings of the leading blade releasing, the second phase and the trailing blade releasing. As shown in FIG. 13, the rotation speed of the motor 41 is faster in a period from the second phase to the third phase (trailing blade releasing) after a predetermined time from the start of the rotation than in a period from the first phase (leading blade releasing) that is a rotation start phase to the second phase.

If the angular area where the leading blade cam inclination portion 36b is formed on the shutter cam gear 36 is equal to that where the trailing blade cam inclination portion 36d is formed thereon, the impact generated at the charge releasing operation of the trailing blade driving lever 35 becomes larger than that generated at the charge releasing operation of the leading blade driving lever 34, by a magnitude corresponding to the fact that a time in which the trailing blade charging roller 35a moves along the trailing blade cam inclination portion 36d is shorter than that in which the leading blade charging roller 34a moves along the leading blade cam inclination portion 36b.

Such a large impact generated at the charge releasing operation of the trailing blade driving lever 35 ends the exposure before completion thereof if the trailing blade armature 38 is not electromagnetically held. For this reason, in order to ensure the holding of the trailing blade armature 38 by the electromagnetic attraction, if increasing the angular area where the trailing blade cam inclination portion 36d is formed on the shutter cam gear 36 and forming the leading blade cam inclination portion 36b in a same shape as that of the trailing blade cam inclination portion 36d, the time required for the charge releasing operation of the leading blade driving lever 34 is increased, thereby increasing the release time lag.

This embodiment sets the angular area where the leading blade cam inclination portion 36b is formed on the shutter cam gear 36 smaller than that where the trailing blade cam inclination portion 36d is formed thereon while equally suppressing the impacts generated at the charge releasing operations of the leading blade driving lever 34 and the trailing blade driving lever 35. A cam lift amount of the leading blade cam inclination portion 36b is equal to that of the trailing blade cam inclination portion 36d. Specifically, as shown in FIG. 5 and in the cam diagram shown in FIG. 11, this embodiment sets the angular area where the leading blade cam inclination portion 36b is formed on the shutter cam gear 36 to 15 degrees, and sets the angular area where the trailing blade cam inclination portion 36d is formed thereon to 30 degrees. Such setting of the angular areas reduces the distance in which the leading blade cam inclination portion 36b is formed as compared with that in which the trailing blade cam inclination portion 36d is formed, which enables reduction of the release time lag.

The angular areas where the leading blade cam inclination portion 36b and the trailing blade cam inclination portion 36d are formed on the shutter cam gear 36 are decided as follows. The impact generated at the charge releasing operation relates to plural elements such as masses of the driving lever and the blades, a rotation angle of the driving lever from the overcharged state to the blade drive standby state and the time in which the charge releasing operation is performed.

This embodiment decides the angular areas where the leading blade cam inclination portion 36b and the trailing blade cam inclination portion 36d are formed on the shutter cam gear 36 such that minimum electromagnetic forces required for withstanding the impacts at the leading blade releasing and the trailing blade releasing to maintain an attracted state of the electromagnet and the armature in each of the leading and trailing blade electromagnetic holding mechanisms are equal to each other. Cases where the electromagnetic forces are equal to each other include a case where the electromagnetic forces have only a small difference that can be regarded as zero.

Then, the system controller 14 cuts off the energization to the leading blade coil 39b and the trailing blade coil 40b after a time interval corresponding to the shutter speed. The cut-off of the energization to the leading blade coil 39b rotates the leading blade driving lever 34 in the counterclockwise direction, and thereby the state shifts into the leading blade movement completion state shown in FIG. 9. The cut-off of the energization to the trailing blade coil 40b rotates the trailing blade driving lever 35 in the counterclockwise direction, and thereby the state shifts into the trailing blade movement completion state shown in FIG. 10.

After the end of the exposure of the image-pickup element 10, the system controller 14 rotates the motor 41 to rotate the mirror cam gear 33 in the clockwise direction and rotate the shutter cam gear 36 in the counterclockwise direction. The rotation of the mirror cam gear 33 causes the cam surface 33a thereof to push the cam contact portion 31b of the mirror driving lever 31 such that the charging operation is performed. Further, the rotation of the shutter cam gear 36 causes the leading and trailing blade cam portions 36a and 36c thereof to push the leading blade charging roller 34a and the trailing blade charging roller 35a such that the charging operation is performed. With these operations, the state returns from the state shown in FIG. 10 to the charge completion state shown in FIG. 5.

Embodiment 2

Figure 14:
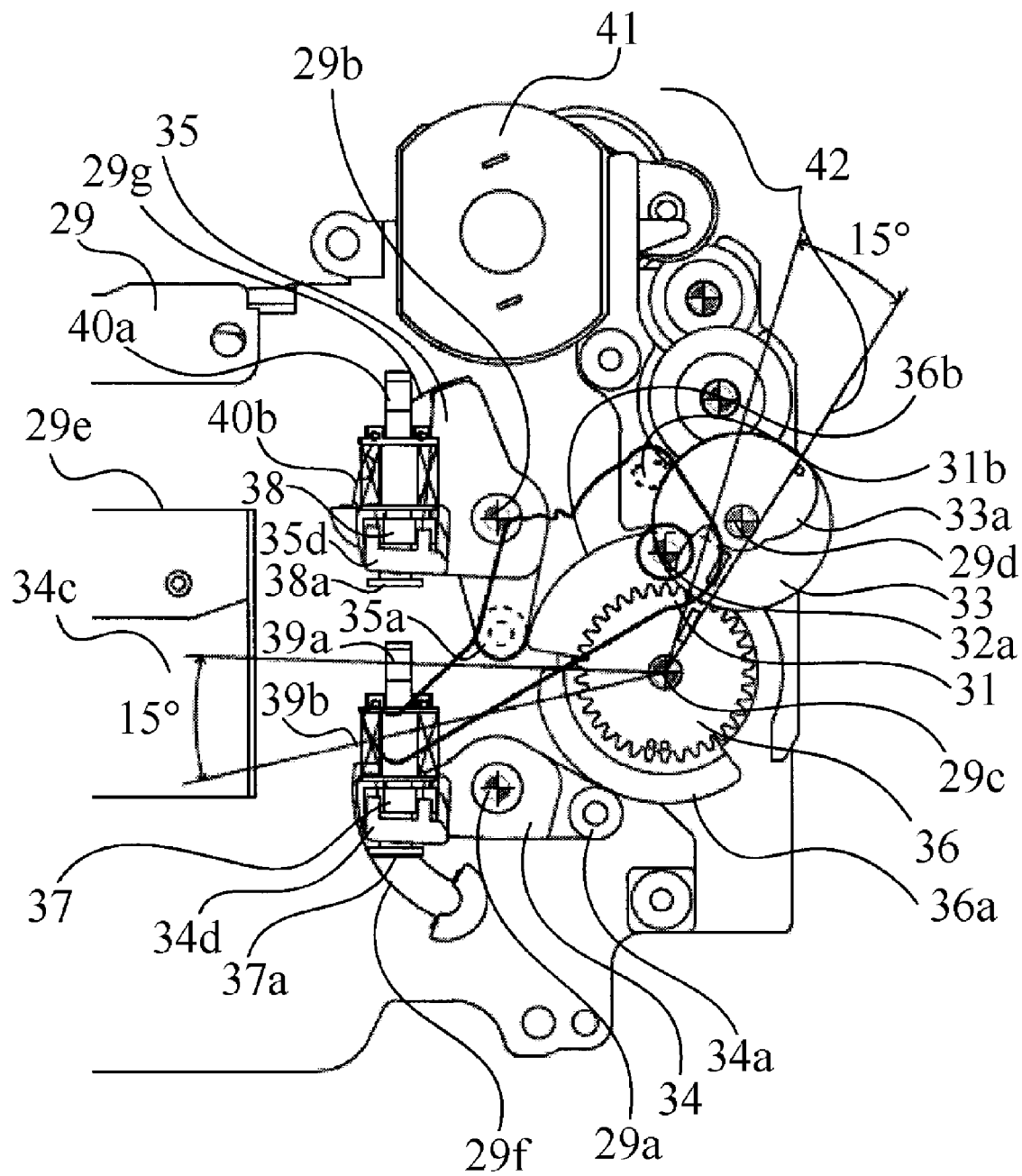
FIG. 14 is a front view of a focal-plane shutter apparatus that is Embodiment 2 of the present invention in a charge completion state.

Next, description will be made of a shutter that is a second embodiment (Embodiment 2) of the present invention with reference to FIGS. 14 and 15. FIG. 14 shows an overcharged state of the shutter, that is, a state where operations of the camera are stopped. Components in this embodiment common to those in Embodiment 1 are denoted by the same reference numerals as those in Embodiment 1, and descriptions thereof are omitted. Operations of the shutter 4 in this embodiment are identical to those of the shutter 4 shown in FIGS. 5, 7 to 10 and 12 in Embodiment 1, and descriptions thereof are omitted.

In this embodiment, on a shutter cam gear 36, a leading blade cam inclination portion 36b and a trailing blade cam inclination portion 36d are formed in angular areas having a same angle. In other words, in a rotation direction of the shutter cam gear 36, the angular area where the leading blade cam inclination portion 36b is formed on the shutter cam gear 36 and the angular area where the trailing blade cam inclination portion 36d is formed thereon are both set to 15 degrees, as shown in a cam diagram of FIG. 15.

Figure 15:
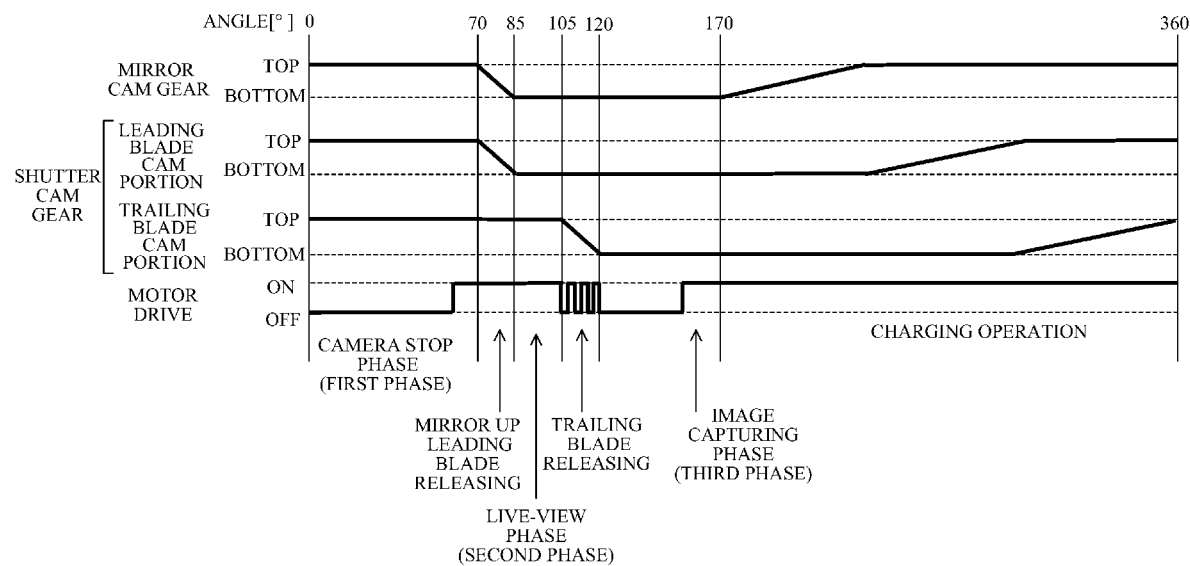
FIG. 15 shows a shape of a cam included in the shutter apparatus of Embodiment 2.

On the other hand, as shown in FIG. 15, this embodiment uses PWM control for drive of a motor 41 at trailing blade releasing (that is, when rotating a trailing blade driving lever 35 from a charge completion position to a blade drive standby position) to reduce an effective voltage to be applied to the motor 41. In other words, this embodiment makes a rotation speed of the shutter cam gear 36 for the trailing blade releasing different from (lower than) that for leading blade releasing (that is, when rotating a leading blade driving lever 34 from a charge completion position to a blade drive standby position) to increase a time taken for the trailing blade releasing (that is, for a charge releasing operation of the trailing blade driving lever 35). This enables reduction of an impact applied to a trailing blade electromagnet 40 and a trailing blade armature 38 at the trailing blade releasing. A duty ratio in the PWM control is decided as follows. That is, the duty ratio is set such that a minimum electromagnetic force required for withstanding the impact at the trailing blade releasing to maintain an attracted state of the trailing blade electromagnet 40 and a trailing blade armature 38 is equal to a minimum electromagnetic force required for withstanding the impact at the leading blade releasing to maintain an attracted state of the leading blade electromagnet 39 and a leading blade armature 37. Cases where the electromagnetic forces are equal to each other include a case where the electromagnetic forces have only a small difference that can be regarded as zero.

This embodiment makes it possible not only to obtain the same effects as those of Embodiment 1, but also to use an angular area of the shutter cam gear 36 other than the angular area for the trailing blade releasing for other sequences since the angular area for the trailing blade releasing can be set small. For example, it is possible to increase an angular area of the shutter cam gear 36 for a charging operation so as to reduce a voltage (or an electric current) to be applied to the motor 41.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-252485, filed on Nov. 2, 2009, which is hereby incorporated by reference herein in its entirety.

What is claimed is:

1. A focal-plane shutter apparatus comprising:
   leading blades;
   trailing blades;
   a leading blade driving member configured to receive an urging force generated by a leading blade urging member to drive the leading blades;
   a trailing blade driving member configured to receive an urging force generated by a trailing blade urging member to drive the trailing blades;
   a leading blade electromagnetic holding mechanism configured to hold the leading blade driving member by using an electromagnetic force in a state where the leading blade urging member is charged;
   a trailing blade electromagnetic holding mechanism configured to hold the trailing blade driving member by using an electromagnetic force in a state where the trailing blade urging member is charged;
   a motor; and
   a cam member including a leading blade cam and a trailing blade cam, and configured to be rotated by the motor in one direction such that the leading and trailing blade cams respectively make contact with follower portions of the leading and trailing blade driving members to drive the leading and trailing blade driving members in a charging direction in which the leading and trailing blade urging members are charged, and then to allow each of the leading and trailing blade driving members to move from a charge completion position where the drive thereof in the charging direction is completed to a blade drive standby position,
   wherein the leading blade cam includes a leading blade cam inclination portion and the trailing blade cam includes a trailing blade cam inclination portion, the leading and trailing blade inclination portions respectively allowing each of the leading and trailing blade driving members to move from the charge completion position to the blade drive standby position, and
   wherein, in a rotation direction of the cam member, a first angular area where the leading blade inclination portion is formed on the cam member is smaller than a second angular area where the trailing blade inclination portion is formed thereon.

2. A focal-plane shutter apparatus according to claim 1, wherein the first and second angular areas are set such that, when the leading and trailing blade inclination portions allow the leading and trailing blade driving members to move from the charge completion position to the blade drive standby position, the electromagnetic forces in the leading and trailing blade electromagnetic holding mechanisms required respectively for holding the leading and trailing blade driving members are equal to each other.

3. An image-pickup apparatus comprising:
   a focal-plane shutter apparatus according to claim 1; and
   an image-pickup element whose exposure amount is controlled by the focal-plane shutter apparatus.

4. A focal-plane shutter apparatus comprising:
   leading blades;
   trailing blades;
   a leading blade driving member configured to receive an urging force generated by a leading blade urging member to drive the leading blades;
   a trailing blade driving member configured to receive an urging force generated by a trailing blade urging member to drive the trailing blades;
   a leading blade electromagnetic holding mechanism configured to hold the leading blade driving member by using an electromagnetic force in a state where the leading blade urging member is charged;
   a trailing blade electromagnetic holding mechanism configured to hold the trailing blade driving member by using an electromagnetic force in a state where the trailing blade urging member is charged;
   a motor;
   a cam member including a leading blade cam and a trailing blade cam, and configured to be rotated by the motor in one direction such that the leading and trailing blade cams respectively make contact with follower portions of the leading and trailing blade driving members to drive the leading and trailing blade driving members in a charging direction in which the leading and trailing blade urging members are charged, and then to allow each of the leading and trailing blade driving members to move from a charge completion position where the drive thereof in the charging direction is completed to a blade drive standby position; and a controller configured to control the motor, wherein the controller is configured to change a rotation speed of the motor between when the leading blade cam drives the leading blade driving member and when the trailing blade cam drives the trailing blade driving member such that, when the leading and trailing blade driving members are allowed to be moved from the charge completion position to the blade drive standby position, the electromagnetic forces in the leading and trailing blade electromagnetic holding mechanisms required respectively for holding the leading and trailing blade driving members are equal to each other.

5. An image-pickup apparatus comprising:

a focal-plane shutter apparatus according to claim 4; and an image-pickup element whose exposure amount is controlled by the focal-plane shutter apparatus.

\* \* \* \* \*